Nov. 14, 1944.    W. H. FARR    2,362,810
PISTON RING AND METHOD OF MAKING SAME
Filed Nov. 16, 1938
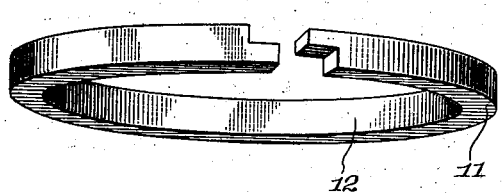
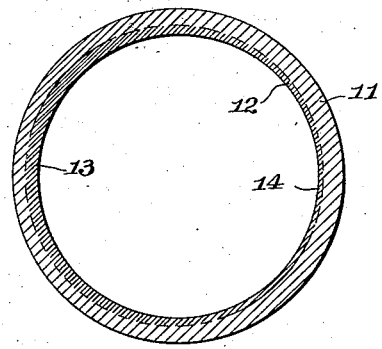
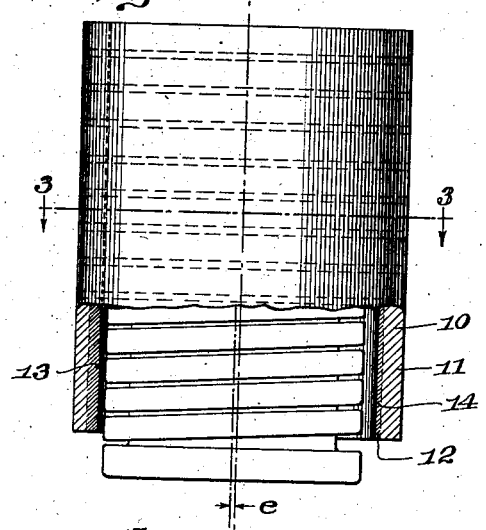
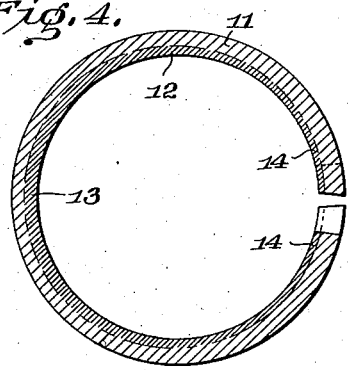
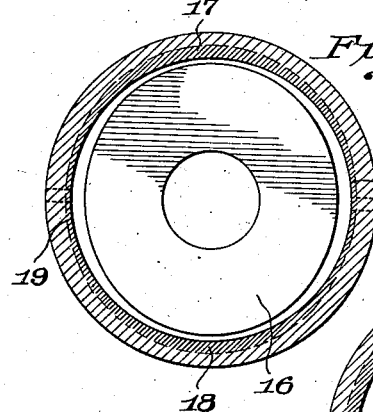
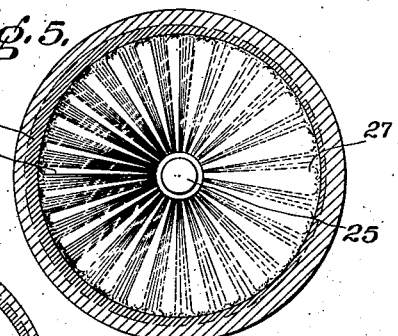
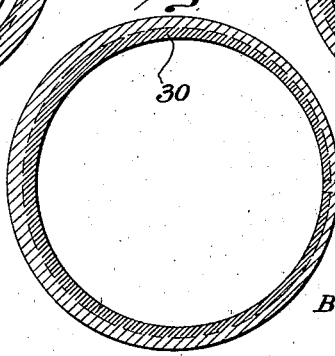
INVENTOR:
Warren H. Farr
BY John P. Tarbox
ATTORNEY

UNITED STATES PATENT OFFICE 2,362,810

PISTON RING AND METHOD OF MAKING SAME

Warren H. Farr, Detroit, Mich., assignor to Budd Wheel Company, Philadelphia, Pa., a corporation of Pennsylvania Application November 16, 1938, Serial No. 240,676

4 Claims. (Cl. 309—44)

The present invention relates in general to resilient bearing elements and method of making the same, and more specifically to metallic piston rings and the like, and is an improvement over my copending application No. 203,784 filed April 23, 1938.

The main object of the invention is to provide a spring ring such as a piston ring or like article having the quality of resiliency without such hardness as would be undesirable in a sliding bearing element such as a piston ring intended not to produce substantial wear on the complementary bearing element such as an engine cylinder wall, and in which the degree of resiliency varies around the length of the annulus.

Among other articles contemplated are hollow pistons such as have a split skirt portion to which the desired qualities above mentioned are to be imparted, and in which varying resiliency is desired at different points.

Another object is the provision of a piston ring or like article having a resilient portion of varying resiliency around the ring and an integral relatively soft portion, the latter having the qualities desired in a bearing intended not to produce substantial wear or scoring of its complementary bearing member.

A specific object is the provision of a split metallic piston ring having a tempered or hardened portion of high spring quality near and including its inner face, with its thickness greatest opposite the open end, and an integral, normalized or relatively soft portion including the outer or bearing face.

A further object is the provision of an economical and efficient method of producing piston rings or like articles of the above kind, having a varying thickness of hardened resilient layer.

Heretofore, where the varying resilient spring quality of a split ring was desired, the ring was made thicker opposite the split in order to provide increased stiffness and tension at such point. The rings thus had eccentric inner and outer walls and thus due to increased radial thickness greater rigidity was imparted to the thicker portion. Such rings required deeper piston grooves, weakening or causing increases in weight of piston in order to assure the necessary strength. The present invention presents a simplified economical solution of this problem in its provision of a ring having concentric inner and outer walls and yet having greater stiffness opposite the split. The hardened inner layer of varying radial depth integral with the outer soft wearing surface may not only permit of a thinner ring but also permits of the introduction of any degree of varying stiffness. An advantage of the integral structure here disclosed is that the outer portion does not have to rely wholly upon its strength alone but is reinforced by the inner integral portion so that the strength of the ring is the combined strength of the whole.

Various other objects and advantages of the invention will be apparent from a perusal of the following specification and the drawing accompanying the same.

In the drawing:

Fig. 1 is a perspective view of a piston ring embodying the invention.

Fig. 2 is a side elevation partly in section of a treated cylinder from which the rings are cut, showing the eccentric coil and hardening.

Fig. 3 is a section on the line 3—3 of Fig. 2.

Fig. 4 is a section of the ring shown in Fig. 1, and illustrating the hard and soft zones.

Fig. 5 is an alternative method involving eccentric quenching and

Fig. 6 is a diagrammatic showing of the use of an oval coil to produce double eccentricity of hardening as on a piston wall.

Fig. 7 is a section through a modified eccentric ring also eccentrically hardened.

Referring to the drawing in detail and first to Fig. 2, 10 represents a cylinder of piston ring material such as any metal or alloy hardenable by heat treatment preferably a ferrous alloy of a composition such as to have, in the normalized state, the requisite firmness and softness desirable for the outer portion of the piston ring, and which upon tempering or heat treating will assume the quality of resiliency, toughness and other qualities also desirable in a piston ring. This localized difference in quality is represented in the drawing by the different densities of hatching wherein the outer lightly hatched portion 11 indicates the unhardened or normalized zone and the inner densely hatched portion 12 is the hardened or heat treated zone. This localized difference in quality is attained by suitable differential heat treatment of the cylinder blank 10, preferably through localized heating produced by high frequency electro-magnetic induction followed by quenching, for example such as is disclosed in the copending applications of Howard E. Somes Serial No. 50,829, filed November 21, 1935, for Inside induction heating, and Serial No. 164,320, filed September 17, 1937, for an Induction heating treating apparatus. Thus treated, the outer portion including the external surface of the cylinder blank has that relative softness and toughness requisite for wearing purposes while the interior hardened zone has the quality of a high degree of resilience.

In order to provide gradually increasing stiffness along one side, a gradually increasing thickness of hardened material is provided by eccentrically locating the inducing coil as at C with the cylinder blank 10, so that greater current concentration will be induced in the portion nearest the inducing coil and hence when subsequently quenched, will produce a hardened layer of greater thickness as shown at 13, and of lesser thickness as shown at 14.

With the cylinder blank brought to the condition thus described, it is cut as by grinding or other suitable method, into separate continuous rings such as is shown in section in Fig. 4 which are thereafter split in any suitable manner to form the completed split piston ring as shown in Fig. 1, it being understood that the split is positioned diametrically opposite the thicker hardened portion. A preferred method of effecting this splitting of the ring is to grind through part way from one flat surface toward the other and then from the opposite flat surface, taking a cut circumferentially offset from the first cut thus producing the offset lapping ends as shown in Fig. 1.

The ring thus formed has the combined qualities of varying resiliency desirable for maintaining the split ring in expanded condition under slight but more uniform tension against the walls of the cylinder in which the ring is to be used, together with the relative softness and toughness necessary in a bearing surface intended to make firm contact with the cylinder walls under appreciable pressure without substantial wear or scoring of the cylinder wall.

Preferably the material from which the cylindrical blank is formed is one of the known or other suitable alloys of carbon steel which may contain manganese, phosphorus, sulphur and chromium, and hardenable by heat treatment, the blank, before the hardening heat treatment, being properly normalized in known manner to attain the desired degree of softness and other qualities of normalized carbon steel. With such material the inner zone 12 of the finished article will be found to consist mainly of martensite and the outer normalized zone of sorbite, with an intermediate eccentric zone of troostite, relatively thin and sharply defined. The hardening thus terminates quite abruptly in the normalized metal. It will be noted that inasmuch as the resilient spring portion 12 and the outer bearing portion 11 are integral, they are mutually reinforcing so that the bearing portion 11 although relatively soft does not have to be as thick as where it constitutes an outer self-supporting ring element separate from an inner expansion ring element. Thus where desirable, the outer portion 11 need be only thick enough to allow for wear, thus permitting substantially the greater portion of the ring to be formed of a resilient material of lasting spring quality or low mechanical hysteresis, but of varying cross section for more uniform pressure. It is also to be noted that, while for the sake of illustration a definite showing of the relative thickness of the two zones at the varying points is presented, such showing is made simply by way of example, and that in practice the ratio may be varied to any amount desired.

Pistons of the split variety may likewise be provided with a hardened resilient zone of varying cross section, and by employing an oval heat treating inducing coil may harden two diametrically opposed thicker layers as shown in Fig. 6. The coil 16 being oval will cause higher current concentrations in the portions 17 and 18 which upon quenching will produce hardened areas of greater cross section than at 19 and 20.

The same effect may be produced by resorting to an eccentric quenching nozzle, or by providing more rapid quenching over portions than others, thus producing a deeper layer of hardened material where rapidly quenched, despite uniform heating throughout from a concentric coil. Also eccentric heating as well as eccentric quenching may be employed to exaggerate the effect of one and thus reduce the extent of heating time or the extent of eccentricity necessary for the coil and quench as when acting above. In Fig. 5, a diagrammatic view of an eccentric quenching nozzle 25 is illustrated. Greater flow of quenching fluid as at 26 is provided than at 27, so that greater depth of hardening takes place along the ring at 28 due to faster quenching. The same effect may result if the nozzle be eccentrically positioned and the fluid flow uniform in every direction from the center of the nozzle.

It will be understood that the underlying principle depends on the concentration of currents along an inner surface area, and where such currents are concentrated, the remainder adjoining portion is practically unheated, but where the currents distribute themselves along the portion spaced from the inducing coil, the whole cross-section is heated but to a lower temperature, and while the inner surface becomes most heated, the depth of material brought to a hardening temperature is relatively shallow. With the entire cross-section heated, the outer portion does not act as a quench, as does the outer portion adjoining the portion in which the current is concentrated, and hence this latter portion is subjected to fluid quench as well as the quenching effect of the adjoining metal which rapidly absorbs heat from the heated portion.

While the invention has been described as one obviating the necessity of providing varying radially thick rings to obtain varying stiffness, that is, rings having eccentric internal and external surfaces, it also should be understood that the present invention may be used in conjunction with a ring of non-concentric internal and external surfaces, either to act in conjunction with the varying thickness to provide additional rigidity or to provide a more uniformly thick soft wearing thickness adjacent the varying thickness of the hardened portion. Where such a combined arrangement exists, eccentricity of the hardened portion as well as the eccentricity of the inner and outer surfaces may both be reduced since their combined effects may produce the desired result. Such a ring is illustrated in section in Fig. 7 and the hardened portion is indicated at 30.

While I have herein shown and described a specific embodiment of the means and a specific phase of the method of the invention for the sake of disclosure, it is to be understood that the invention is not limited to such specific embodiment or phase but contemplates all such modifications and variants thereof as fall fairly within the scope of the appended claims.

What I claim is:

1. A piston ring having concentric radially inner and outer faces, said entire inner face and the material adjacent thereto being hardened, said entire outer face and the material adjacent thereto being substantially unhardened, the line of demarcation between said hardened and unhardened material extending throughout the ring and being eccentric to said faces whereby the radial thickness of said hardened material varies throughout the ring.

2. A metallic piston ring of uniform cross section and having concentric radially inner and outer faces, said entire inner face and the material adjacent thereto being hardened, said entire outer face and the material adjacent thereto being substantially unhardened, the line of demarcation between said hardened and unhardened material extending throughout the ring and being eccentric to said faces whereby the radial thickness of said hardened and unhardened material varies throughout the ring.

3. A split ring of hardenable metal having substantially circular radially inner and outer faces, the material adjacent said inner face being hardened and the material adjacent said outer face being substantially unhardened, the line of demarcation between said hardened and unhardened material extending throughout the ring and being eccentric to said inner face with the maximum depth of said hardened material positioned substantially opposite the split in the ring.

4. A split piston ring having concentric radially inner and outer faces, the material adjacent said inner face being hardened and the material adjacent said outer face being substantially unhardened, the zone of demarcation between said hardened and unhardened material extending throughout the ring and being eccentric to said faces with the maximum depth of said hardened material positioned substantially opposite the split in the ring.

WARREN H. FARR.